United States Patent
Irwin (10) Patent No.: US 8,182,698 B2
(45) Date of Patent: May 22, 2012

(54) METHOD FOR IMPROVING GYPSUM/PHOSPHORIC ACID SLURRY FILTRATION USING CARBOXYMETHYL CELLULOSE

(75) Inventor: Louis Irwin, Mulberry, FL (US)

(73) Assignee: ARR-MAZ Custom Chemicals, Inc., Mulberry, FL (US)

( * ) Notice: Subject to any disclaimer, the term of this patent is extended or adjusted under 35 U.S.C. 154(b) by 93 days.

(21) Appl. No.: 12/828,061

(22) Filed: Jun. 30, 2010

(65) Prior Publication Data
US 2012/0003140 A1   Jan. 5, 2012

(51) Int. Cl.
| | |
|---|---|
| B01D 21/01 | (2006.01) |
| B01D 21/00 | (2006.01) |
| B01D 37/02 | (2006.01) |
| B03D 3/00 | (2006.01) |
| C02F 1/52 | (2006.01) |
| C02F 1/00 | (2006.01) |

(52) U.S. Cl. ...................................................... 210/727
(58) Field of Classification Search .................. 210/720, 210/778, 727, 734, 730; 423/321.1
See application file for complete search history.

(56) References Cited

U.S. PATENT DOCUMENTS

| | | | |
|---|---|---|---|
| 3,140,915 A | 7/1964 | Axelrad et al. | |
| 3,410,655 A | 11/1968 | Ruter et al. | |
| 3,644,091 A | 2/1972 | Naschke et al. | |
| 3,653,827 A | 4/1972 | Hey et al. | |
| 4,310,360 A * | 1/1982 | Kvant | 106/471 |
| 4,382,863 A | 5/1983 | Hashimoto et al. | |
| 4,800,071 A | 1/1989 | Kaesler et al. | |
| 5,185,135 A * | 2/1993 | Pillai et al. | 423/320 |
| 5,211,920 A | 5/1993 | Rey et al. | |
| 5,482,529 A | 1/1996 | Ahlnes et al. | |
| 5,587,046 A * | 12/1996 | Stadler et al. | 438/745 |
| 5,695,647 A | 12/1997 | Carbonell et al. | |
| 5,824,132 A | 10/1998 | Kopyleva et al. | |
| 2003/0163014 A1* | 8/2003 | Ellis et al. | 588/20 |
| 2007/0102368 A1* | 5/2007 | Irwin | 210/728 |

FOREIGN PATENT DOCUMENTS

| | | |
|---|---|---|
| CN | 101255046 A | 9/2008 |
| SU | 1470665 A * | 4/1989 |

OTHER PUBLICATIONS

Biswal et al., "Characterisation of carboxymethyl cellulose and polyacrylamide graft copolymer", 2004. Carbohydrate Polymers 57: 379-387.*
Partial English translation of the Russian patent, Artomasov et al. SU 1470665.*
Biswal et al., 2004, "Characterisation of carboxymethyl cellulose and polyacrilamide graft copolymer", Carbohydrate Polymers 57: 379-387.*

* cited by examiner

Primary Examiner — Christopher Upton
Assistant Examiner — Nader Hossaini
(74) Attorney, Agent, or Firm — Dennis G. LaPointe (57) ABSTRACT

A chemical process to improve the filtration performance for the removal of gypsum from phosphoric acid/gypsum slurry using a filtration aid that is selected from a class of polymers, lower molecular weight anionic polyelectrolytes, which previously have not been used for this application. The polymer is CMC or Carboxymethyl Cellulose, which is a polymerized cellulose ether. CMC is found to be extremely effective for phosphoric acid/gypsum slurry that was produced from igneous phosphate rock. CMC is also available in food grade, which is novel for filtration aids for the production of phosphoric acid which may be used for human or animal feed.

6 Claims, 8 Drawing Sheets

Fig. 1A

| Plant #1 - Igneous Rock- Phosacid Slurry | | | | SL TEMP | 156 | | | | | | | |
|---|---|---|---|---|---|---|---|---|---|---|---|---|
| March 26, 2010 | | | | SL SG | 1.54 | | | | | | | |
| LAB FILTRATION TESTS | | | | Solids | 33.98 | calculated | | | | | | |
| | | | | #1 VOL. | 544 | (1000ml) | | | | | | |
| | | | | #1 TEMP | 118 | | | | | | | |
| SLURRY: | 1000 ML*, 156F, SG 1.540 | | | #1 SG | 1.308 | | | | | | | |
| SW: | 500 ML*,130F, SG 1.018 | | | CAKE cm. | 8.00 | | | | | | | |
| WW: | | | | VACUUM | 20 | | | | | | | |
| PW: | 500 ML*, 138F, SG 1.140 (Dirty) | | | Mix SEC | 20 | | | | | | | |
| TEST #: | 10a/e/11d | 10B | 10C | 10D | 10i | 10J | 10H | 11A | 11B | 11C | 11F | 11G |
| TIME: | 9:21-11:11 | 9:30 | 9:38 | 9:46 | 10:25 | 10:32 | 10:18 | 10:50 | 10:57 | 11:04 | 11:25 | 11:31 |
| Example # | 1 | 2 | 3 | 4 | 5 | 6 | 7 | 8 | 9 | 10 | 11 | 12 |
| POLYMER: | BK | Std-PAM | | Std-PAM | CMC | CMC | CMC | CMC | CMC | CMC | CMC | CMC |
| PPM/ VOL.: | 0 | 3 | 4 | 5 | 5 | 7.5 | 10 | 15 | 20 | 25 | 30 | 35 |
| BLANKS | avg 3 | | | | | | | | | | | |
| SL.SEC: | 14.5 | | | | | | | | | | | |
| SW.SEC: | 31.0 | | | | | | | | | | | |
| PW.SEC: | 15.2 | | | | | | | | | | | |
| | | | | | | | | | | | | |
| POLYMER | | | | | | | | | | | | |
| SL.SEC: | | 13.0 | 12.7 | 12.8 | 11.8 | 11.6 | 11.1 | 10.5 | 9.7 | 9.4 | 8.8 | 9.0 |
| SW.SEC: | | 25.4 | 26.8 | 26.3 | 25.4 | 25.0 | 26.1 | 23.0 | 22.6 | 21.7 | 22.1 | 20.8 |
| PW.SEC: | | 12.5 | 12.1 | 12.1 | 12.6 | 12.7 | 11.7 | 11.0 | 11.5 | 10.4 | 10.5 | 10.3 |
| | | | | | | | | | | | | |
| BK-TOTAL: | 60.7 | | | | | | | | | | | |
| PL-TOTAL: | | 50.9 | 51.6 | 51.2 | 49.8 | 49.3 | 48.9 | 44.5 | 43.8 | 41.5 | 41.4 | 40.1 |
| %<TOTAL | | 16.1 | 14.9 | 15.6 | 17.9 | 18.7 | 19.4 | 26.6 | 27.8 | 31.6 | 31.8 | 33.9 |
| %<SL: | | 10.3 | 12.4 | 11.7 | 18.6 | 20.0 | 23.4 | 27.6 | 33.1 | 35.2 | 39.3 | 37.9 |
| %<SW: | | 18.0 | 13.4 | 15.1 | 18.0 | 19.3 | 15.7 | 25.7 | 27.0 | 29.9 | 28.6 | 32.8 |
| %<PW: | | 17.8 | 20.4 | 20.4 | 17.1 | 16.4 | 23.0 | 27.6 | 24.3 | 31.6 | 30.9 | 32.2 |

| Plant #2 - Igneous Rock Phosacid Slurry | | | | | SL TEMP | 154 | |
|---|---|---|---|---|---|---|---|
| March 31, 2010 | | | | | SL SG | 1.512 | |
| LAB FILTRATION TESTS | | | | | Solids | 32.78 | calculated |
| | | | | | #1 VOL. | 590 | (1000ml) |
| | | | | | #1 TEMP | 120 | |
| SLURRY: | 1000 ML*, 154F, SG 1.512 | | | | #1 SG | 1.288 | |
| SW: | 500 ML*,124F, SG 1.016 | | | | CAKE cm. | 7.80 | |
| WW: | | | | | VACUUM | 20 | |
| PW: | 500 ML*, 126F, SG 1.064 (Dirty) | | | | Mix SEC | 30 | |

| TEST #: | 2A/E | 2D | 2B | 2C | 2E/I | 2H | 2F | 2G |
|---|---|---|---|---|---|---|---|---|
| TIME: | 10:10-190:36 | 10:30 | 10:18 | 10:24 | 10:36-11:00 | 10:55 | 10:40 | 10:49 |
| Example # | 13 | 14 | 15 | 16 | 17 | 18 | 19 | 20 |
| POLYMER: | BK | Std-PAM | Std-PAM | Std-PAM | BK | CMC | CMC | CMC |
| PPM/ VOL.: | 0 | 5 | 6 | 7 | 0 | 15 | 20 | 25 |
| BLANKS | avg 2 | | | | AVG 2 | | | |
| SL.SEC: | 8.8 | | | | 9.5 | | | |
| SW.SEC: | 18.0 | | | | 18.7 | | | |
| PW.SEC: | 10.6 | | | | 10.7 | | | |
| | | | | | | | | |
| POLYMER | | | | | | | | |
| SL.SEC: | | 8.0 | 7.4 | 7.8 | | 7.1 | 6.7 | 6.8 |
| SW.SEC: | | 17.8 | 16.4 | 17.0 | | 15.4 | 15.5 | 15.8 |
| PW.SEC: | | 10.1 | 10.0 | 9.6 | | 9.8 | 9.4 | 8.7 |
| | | | | | | | | |
| BK-TOTAL: | 37.3 | | | | 38.9 | | | |
| PL-TOTAL: | | 35.9 | 33.8 | 34.4 | | 32.3 | 31.6 | 31.3 |
| %<TOTAL | | 3.8 | 9.4 | 7.8 | | 17.0 | 18.8 | 19.5 |
| %<SL: | | 8.6 | 15.4 | 10.9 | | 25.3 | 29.5 | 28.4 |
| %<SW: | | 0.8 | 8.6 | 5.3 | | 17.6 | 17.1 | 15.5 |
| %<PW: | | 4.7 | 5.7 | 9.4 | | 8.4 | 12.1 | 18.7 |

| Plant #1 - Igneous Rock- Phosacid Slurry | | SL TEMP | 154 | | | | |
|---|---|---|---|---|---|---|---|
| May 24, 2010 | | SL SG | 1.55 | | | | |
| LAB FILTRATION TESTS | | Solids | 33.86 | calculated | | | |
| | | #1 VOL. | 514 | (1000ml) | | | |
| | | #1 TEMP | 118 | | | | |
| SLURRY: | 1000 ML*, 154F, SG 1.550 | #1 SG | 1.32 | | | | |
| SW: | 500 ML*,126F, SG 1.006 | CAKE cm. | 7.50 | | | | |
| WW: | | VACUUM | 20 | | | | |
| PW: | 500 ML*, 126F, SG 1.130 (Dirty) | Mix SEC | 20 | | | | |
| TEST #: | 1E/K | 1H | 1I | 1J | 1A/E | 1B | 1C | 1D | 1F |
| TIME: | 3:36-4:18 | 3:58 | 4:05 | 4:10 | 3:10-3:36 | 3:16 | 3:23 | 3:29 | 3:41 |
| Example # | 21 | 22 | 23 | 24 | 25 | 26 | 27 | 28 | 29 |
| POLYMER: | BK | Std-PAM | Std-PAM | Std-PAM | BK | CMC | CMC | CMC | CMC |
| PPM/ VOL.: | 0 | 5 | 7 | 9 | 0 | 10 | 20 | 30 | 40 |
| BLANKS | avg 2 | 1000ML | 1000ML | 1000ML | avg 2 | 1000ML | 1000ML | 1000ML | 1000ML |
| SL.SEC: | 13.6 | | | | 13.7 | | | | |
| SW.SEC: | 26.7 | | | | 27.5 | | | | |
| PW.SEC: | 13.9 | | | | 14.3 | | | | |
| | | | | | | | | | |
| POLYMER | | | | | | | | | |
| SL.SEC: | | 12.6 | 11.8 | 12.4 | | 11.0 | 9.5 | 9.4 | 8.9 |
| SW.SEC: | | 24.0 | 23.4 | 27.3 | | 21.7 | 21.3 | 22.0 | 23.4 |
| PW.SEC: | | 13.6 | 13.8 | 13.2 | | 12.0 | 12.2 | 11.8 | 11.0 |
| | | | | | | | | | |
| BK-TOTAL: | 54.1 | | | | 55.5 | | | | |
| PL-TOTAL: | | 50.2 | 49.0 | 52.9 | | 44.7 | 43.0 | 43.2 | 43.3 |
| %<TOTAL | | 9.5 | 11.6 | 4.6 | | 19.4 | 22.5 | 22.1 | 21.9 |
| %<SL: | | 8.0 | 13.9 | 9.5 | | 19.7 | 30.7 | 31.4 | 35.0 |
| %<SW: | | 12.6 | 14.8 | 0.5 | | 20.9 | 22.4 | 19.9 | 14.8 |
| %<PW: | | 4.9 | 3.5 | 7.7 | | 16.1 | 14.7 | 17.5 | 23.1 |

| Plant #3 - Sedimentary- Phosacid Slurry<br>May 13, 2010<br>LAB FILTRATION TESTS | | SL TEMP | 160 | | | | | | | | |
|---|---|---|---|---|---|---|---|---|---|---|---|
| | | SL SG | 1.59 | | | | | | | | |
| | | Solids | 38.10 | (calculated) | | | | | | | |
| | | #1 VOL. | 335 | | | | | | | | |
| SLURRY: | 1000 ML*, 160F, SG 1.590 | #1 TEMP | 110 | | | | | | | | |
| SW: | 500 ML*,148F, SG 1.172 | #1 SG | 1.326 | | | | | | | | |
| WW: | 500 ML*,134F, SG 1.046 | CAKE cm. | 8.0cm | | | | | | | | |
| PW: | 500 ML*, 134F, SG 1.032 | VACUUM | 20 | | | | | | | | |
| | | MIX | 20 | | | | | | | | |
| TEST #: | 1A/E | 1D | 1B | 1C | 1E/J | 2B | 1G | 1H | 1I | 2A | 1J/2D | 2C |
| TIME: | 9:15-9:47 | 9:33 | 9:22 | 9:28 | 9:41-10:15 | 10:28 | 9:55 | 10:01 | 10:07 | 10:23 | 10:15-10:38 | 10:33 |
| Example # | 30 | 31 | 32 | 33 | 34 | 35 | 36 | 37 | 38 | 39 | 40 | 41 |
| POLYMER: | BK | Std-HMW | Std-HMW | Std-HMW | BK | Std + CMC | Std + CMC | Std + CMC | Std + CMC | Std + CMC | BK | CMC |
| PPM/ VOL.: | 0 | 3 | 5 | 7 | 0 | 5+20 | 5+30 | 5+40 | 5+50 | 5+60 | 0 | 60 |
| | avg 2 | | | | avg 2 | | | | | | avg 2 | |
| BLANKS | | | | | | | | | | | | |
| SL.SEC: | 24.0 | | | | 23.6 | | | | | | 22.9 | |
| SW.SEC: | 65.8 | | | | 63.3 | | | | | | 61.5 | |
| WW.SEC: | 45.0 | | | | 44.5 | | | | | | 45.4 | |
| PW.SEC: | 39.4 | | | | 38.9 | | | | | | 38.8 | |
| | | | | | | | | | | | 168.6 | |
| POLYMER | | | | | | | | | | | | |
| SL.SEC: | | 18.5 | 18.7 | 19.3 | | 16.0 | 16.0 | 15.4 | 15.1 | 14.2 | | 19.3 |
| SW.SEC: | | 54.8 | 52.7 | 53.2 | | 42.8 | 42.7 | 43.4 | 41.6 | 40.4 | | 52.7 |
| WW.SEC: | | 36.4 | 35.9 | 35.7 | | 33.5 | 32.2 | 31.2 | 30.5 | 30.3 | | 38.5 |
| PW.SEC: | | 31.7 | 30.5 | 30.2 | | 27.4 | 27.2 | 26.1 | 25.4 | 25.8 | | 33.4 |
| | | | | | | | | | | | | |
| BK-TOTAL: | 174.1 | | | | 170.2 | | | | | | 168.6 | |
| PL-TOTAL: | | 141.4 | 137.8 | 138.4 | | 119.7 | 118.1 | 116.1 | 112.6 | 110.7 | | 143.9 |
| %<TOTAL | | 18.8 | 20.8 | 20.5 | | 29.0 | 30.6 | 31.8 | 33.6 | 34.3 | | 14.6 |
| %<SL: | | 22.8 | 21.9 | 19.4 | | 30.1 | 32.1 | 34.6 | 35.9 | 38.0 | | 15.7 |
| %<SW: | | 16.7 | 19.8 | 19.1 | | 30.4 | 32.5 | 31.4 | 34.3 | 34.3 | | 14.3 |
| % < WW: | | 19.0 | 20.1 | 20.6 | | 26.1 | 27.6 | 29.9 | 31.5 | 33.2 | | 15.1 |
| %<PW: | | 19.5 | 22.6 | 23.4 | | 29.4 | 30.0 | 32.8 | 34.6 | 33.5 | | 13.9 |

Fig. 4B

METHOD FOR IMPROVING GYPSUM/PHOSPHORIC ACID SLURRY FILTRATION USING CARBOXYMETHYL CELLULOSE

BACKGROUND OF THE INVENTION

1. Field of the Invention

The present invention relates, generally, to filtration aids, more particularly, a novel food grade polymer chemistry has been discovered for faster removal of gypsum from phosphoric acid/gypsum slurry to obtain higher phosphoric acid production rates.

2. Description of the Related Art

During the process of producing phosphoric acid (for fertilizer, animal feed, or food use), gypsum is formed as a by-product in the 25-45% phosphoric acid solution. This gypsum is filtered out with various types of vacuum filters. For additional phosphoric acid recovery, the gypsum is furthermore rinsed with fresh or recycled water several times in a reverse flow for maximum recovery. This rinse step adds two to three additional sections to the filter where the filtration rate can be improved. Many plants operate with filters at capacity making this the main limiting factor for phosphoric acid production. Furthermore the filtration rate is very dependent upon the type of phosphate rock added to the phosphoric acid reactor.

Polymeric filtration aids are often added to enhance filtration time for faster production and higher recovery of the phosphoric acid. U.S. Pat. No. 4,800,071 to Kaesler et al. and U.S. Pat. No. 5,211,928 to Rey et al., both discuss the use of various high molecular weight polymers for filtration aids used in gypsum slurry.

The normal application for powder polymers is by making a 0.5-2% polymer solution in water and injecting this into the gypsum/phosphoric acid slurry prior to filtration (by vacuum filter). The present invention also uses CMC made in a 0.5-2% polymer solution. The amount of polymer filtration aid for maximum performance varies with each production facility and phosphate rock source, as well as the polymer chemistry, and ranges from 2-150 ppm (via volume of slurry). The amount of performance improvement (over untreated slurry) by the filtration aid varies from 5-70%, and is typically<15% for igneous rock and also<20% for Florida sedimentary rock.

SUMMARY OF THE INVENTION

The present invention is a chemical process to improve the filtration performance for the removal of gypsum from phosphoric acid/gypsum slurry via a novel filtration aid. The instant invention filtration aid is selected from a unique class of polymers, lower molecular weight anionic polyelectrolytes, which previously have not been used for this application. This novel polymer is CMC or Carboxymethyl Cellulose, which is a polymerized cellulose ether. It has been found that CMC is extremely effective for phosphoric acid/gypsum slurry that was produced from igneous phosphate rock, and a synergistic effect for a dual polymer treatment with CMC for gypsum slurry produced from sedimentary phosphate rock has been discovered. As can be assumed from the fact that the inventive process presented herein is related to the initial processing of phosphate rock at plants, one skilled in the art clearly understands that the polymeric filtration aid method presented herein is for gypsum removal from 25%-45% phosphoric acid solutions (filter slurry), as noted in the first paragraph of the description of related art section delineated above, containing a resultant phosphoric acid/gypsum slurry produced from igneous or sedimentary phosphate rock at the plant. CMC is also available in food grade, which is novel for filtration aids for the production of phosphoric acid which may be used for human or animal feed.

Generally, the invention is a polymeric filtration aid method for gypsum removal from phosphoric acid/gypsum slurry where the method comprises injecting a CMC polymer solution into a phosphoric acid/gypsum slurry, wherein said CMC polymer is carboxymethylcellulose comprising a polymerized cellulose ether. A typical time interval between injection of the CMC polymer and filtration can be in the range of about 10-20 seconds. A preferred time interval, although not required, between injection of the CMC polymer and filtration is about 20 seconds.

CMC polymer is produced with salt so at 60-99.4% dry basis active it is a technical grade polymer. CMC polymer at 99.5% dry basis active is a food grade polymer. CMC polymer is an anionic polyelectrolyte with a low polymer molecular weight of 90,000-900,000.

The CMC polymer improves filtration rate performance over standard high molecular weight PAM polymers and CMC polymer produces the highest filtration rate improvement on slurry produced from igneous rock.

For phosphoric acid/gypsum slurry from sedimentary rock a dual polymer system with CMC produces the highest filtration.

DETAILED DESCRIPTION OF THE INVENTION

Various anionic, non-ionic, cationic and sulfonated polymers have been used as filtration aids for removing gypsum from phosphoric acid. Each phosphate rock ore and its phosphoric acid slurry are specific to which polymer performs best and determines what polymer dosage is required. Phosphate ore typically mined in the Western part of the United States (mining regions generally found west of the Mississippi River) with high organic content used for the phosphoric acid/gypsum slurry typically has the best response to polymeric filtration aids, which can improve filtration rate performance by over 50%. Florida phosphate ore has typically shown rate improvements of 15-20% with polymeric filtration aids and are commercially used. Due to poor performance of less than 15% improvement, the commercial use of filtration aids for igneous phosphate ore from Brazil and Canada, as well as Morocco ore has been limited, with only non-ionic polyacrylamides showing some success.

Current filtration aids for phosphoric-gypsum removal are typically high molecular weight, 10-20 million molecular weight polyacrylamides (PAM) or anionic PAM+Polyacrylate co polymers. Low molecular weight polymers, <2 million molecular weight; and very low, <200,000 molecular weight, cationic coagulants typically perform poor for phosphoric-gypsum removal.

Unexpected excellent performance has been achieved with the present invention's novel Polymer CMC or Carboxymethylcellulose. Compared to PAM, CMC is a very low, <900,000 molecular weight, anionic polymer. CMC as a food grade is historically known for its use as a viscosity modifier; whereas technical grades are used as depressants in the mining industry and for oil drilling chemicals.

It has been found that low organic and or igneous rock, from Brazil or Canada, produces a phosphoric-gypsum slurry that does not respond well to normal filtration aids—typically 5%-15% filtration rate improvement found at best with PAM. High molecular weight anionic polymers typically have<5% improvement or actually hurt the filtration rate for these types of slurry, from igneous rock. CMC (which is anionic) has been found to produce 30+% improvement in filtration rate (or >100% improvement over PAM polymers). CMC usage range/performance is also "wide" at 5-40 ppm, allowing for easier control, compared to the typical 3-7 ppm for PAM.

The instant inventor has also discovered CMC to be beneficial for gypsum slurry produced from sedimentary Florida rock. When CMC is used as a dual system with a standard high molecular weight (HMW) polymer a synergetic effect is observed as the filtration rate over single polymers improves 50-100%.

High molecular weight polymers are considered "GRAS"—generally recognized as safe and use for food applications is limited. CMC is available in food grade, which is novel for filtration aids for the production of phosphoric acid which may be used for human or animal feed.

EXAMPLES

The following examples serve to provide further appreciation of the invention and are not meant in any way to restrict the effective scope of the invention.

Example #1

Figure 1A:
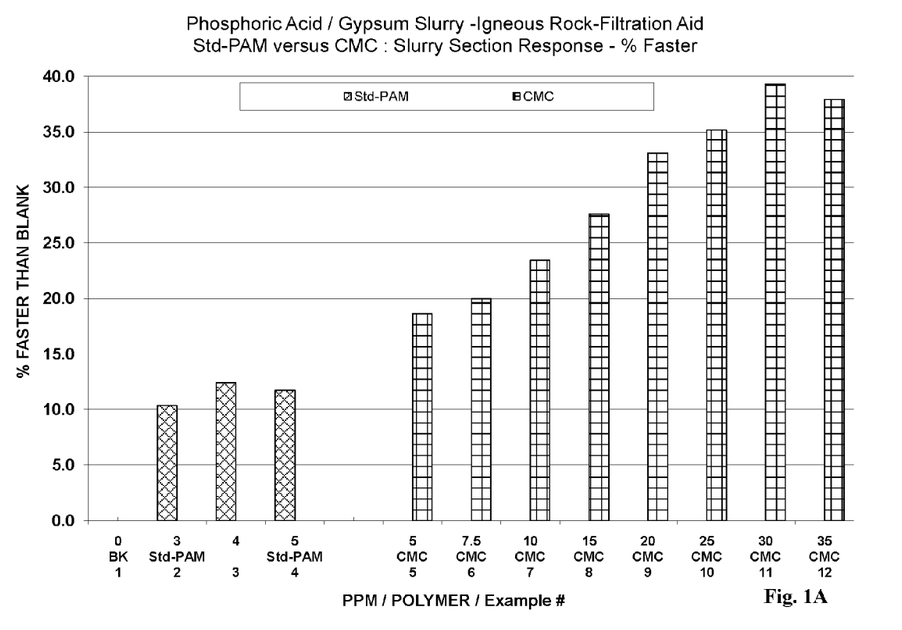
FIG. 1A is a chart depicting an example of filtration performance of standard PAM polymer versus CMC polymer, for phosphoric acid/gypsum slurry.
Figure 1B:
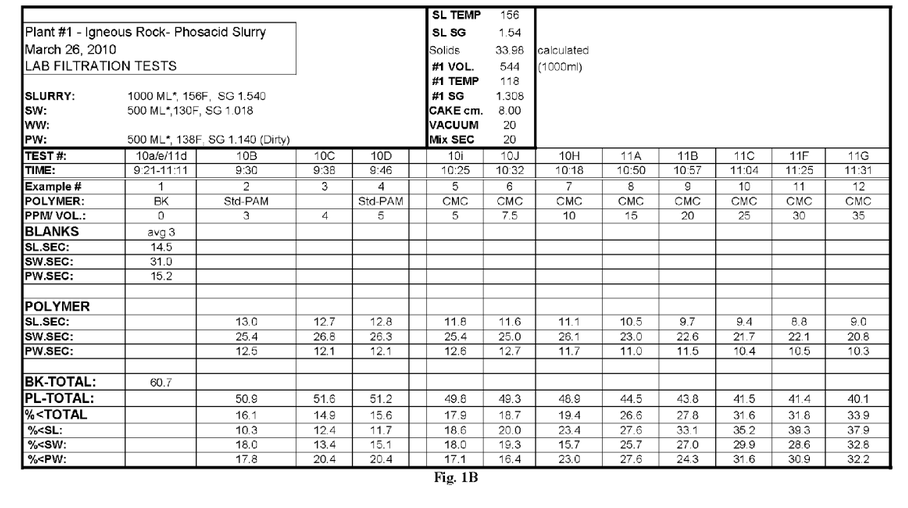
FIG. 1B is a table of data supportive of the chart of FIG. 1A.

FIG. 1A is a chart (with supporting data at FIG. 1B) depicting an example of filtration performance of standard PAM polymer versus CMC polymer, for phosphoric acid/gypsum slurry; produced from igneous phosphate rock source #1. The std.-PAM produced maximum 12.4% improvement in filtration rate over untreated (or Blank) slurry; whereas CMC produced 39.3% improvement in filtration over similar untreated slurry. Using the difference in actual filtration seconds CMC calculates to 30.7% faster than std-PAM or as a ratio, CMC gives 3.2 times more improvement than std-PAM.

Example #2

Figure 2A:
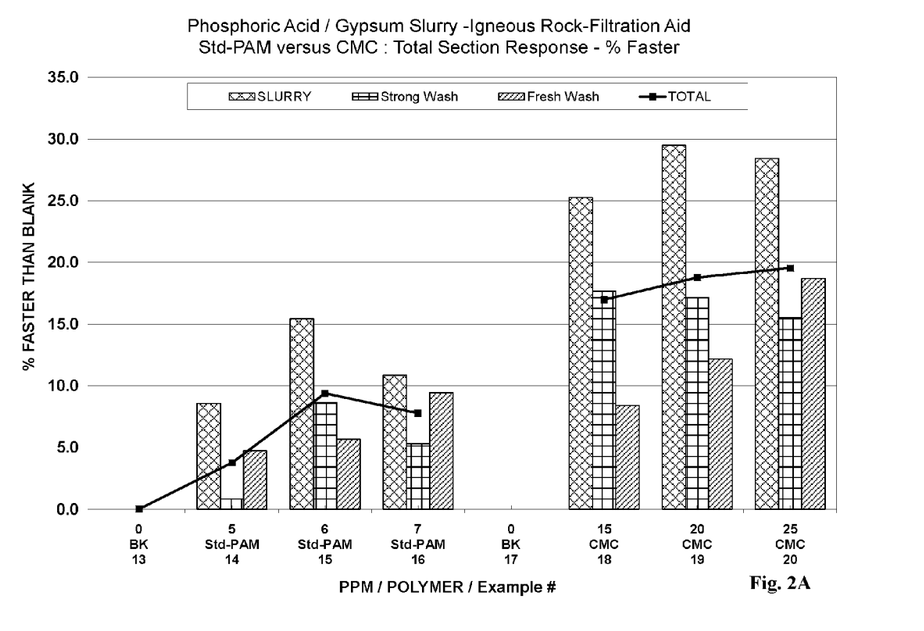
FIG. 2A is a chart which shows an example of filtration performance on both slurry and two rinse water filtration sections, for the standard PAM polymer versus CMC.
Figure 2B:
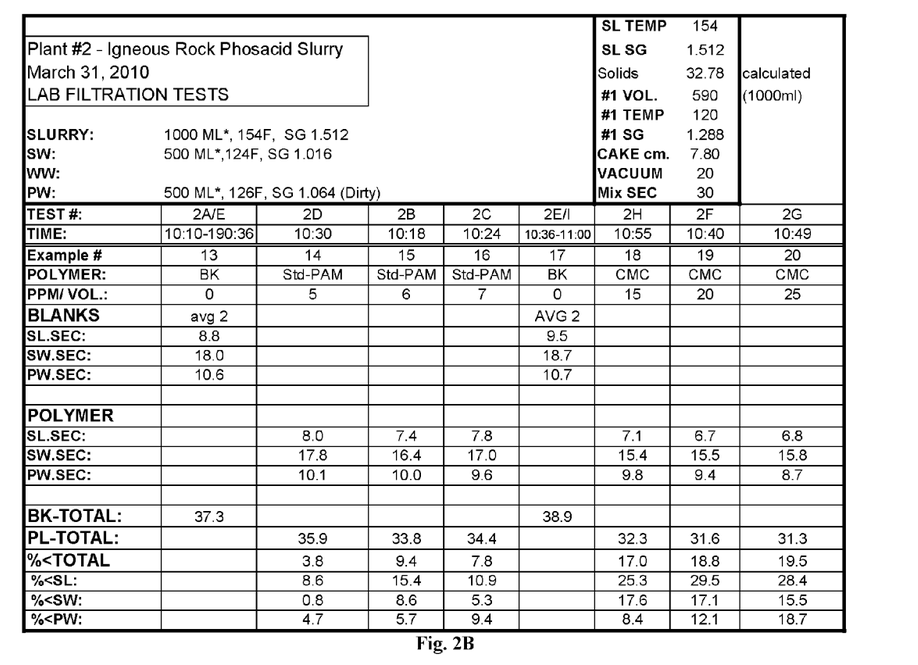
FIG. 2B is a table of data supportive of the chart of FIG. 2A.

FIG. 2A (with supporting data at FIG. 2B) is a chart which shows an example of filtration performance for both slurry and two rinse water filtration sections, for the standard PAM polymer versus CMC polymer; for phosphoric acid/gypsum slurry produced from igneous phosphate rock source #2. The maximum total improvement (or average of all three filtration sections) for standard.-PAM polymer is 9.4% improvement in filtration rate over untreated (or Blank) slurry; whereas CMC produced 19.5% total improvement in filtration over similar untreated slurry. As a ratio, CMC gives 2.0 times more improvement than std-PAM.

Figure 3A:
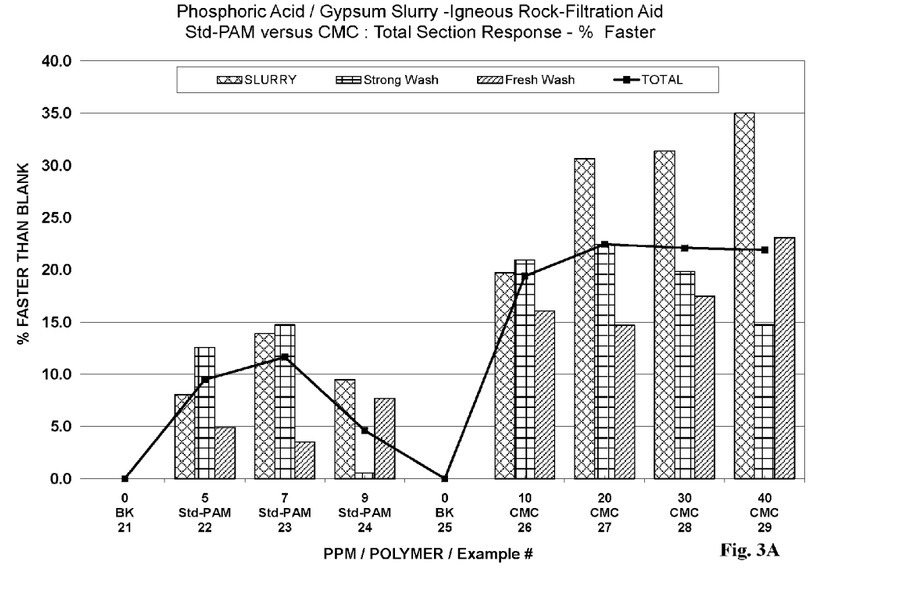
FIG. 3A is a chart which shows an additional example of CMC polymer filtration performance for another source of slurry.
Figure 3B:
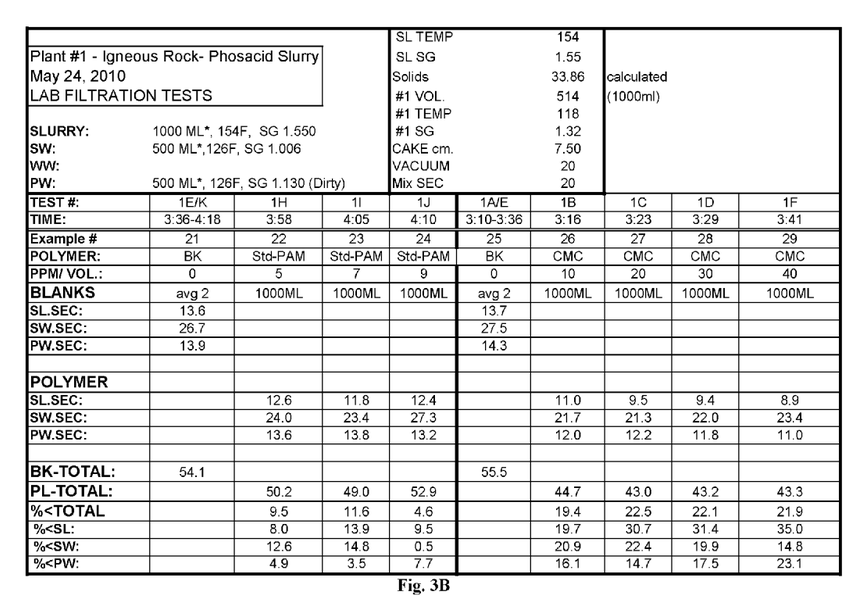
FIG. 3B is a table of data supportive of the chart of FIG. 3A.

FIG. 3A (with supporting data at FIG. 3B) is a chart which shows an additional example of CMC polymer filtration performance for phosphoric acid/gypsum slurry produced from igneous phosphate rock source #3. The maximum total improvement (or average of all three filtration sections) for std.-PAM polymer is 11.6% improvement in filtration rate over untreated (or Blank) slurry; whereas CMC produced 22.5% total improvement in filtration over similar untreated slurry. As a ratio, CMC gives 1.9 times more improvement than std-PAM.

Figure 4A:
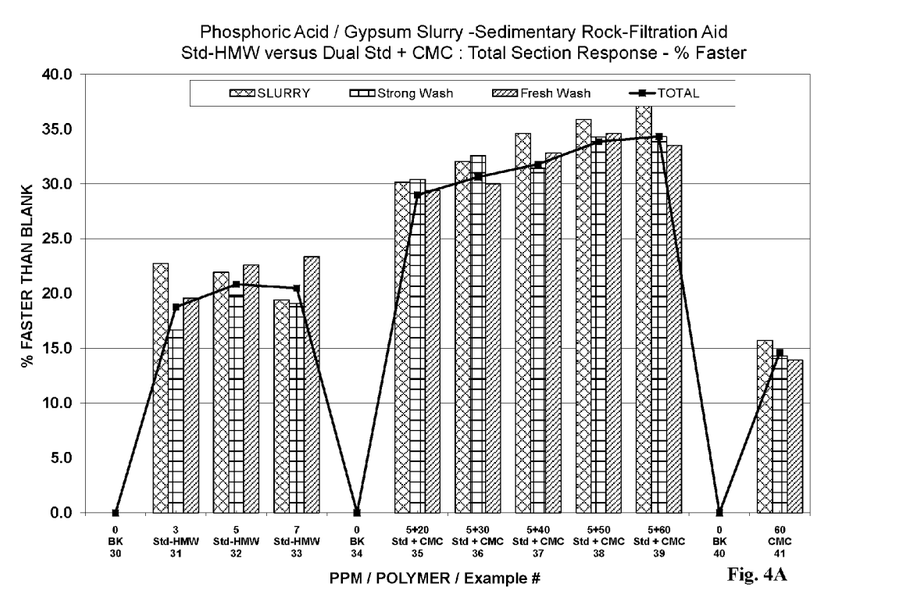
FIG. 4A is a chart which shows an example of the synergistic effect of a dual system with CMC polymer for improved filtration on a sedimentary slurry source.
Figure 4B:
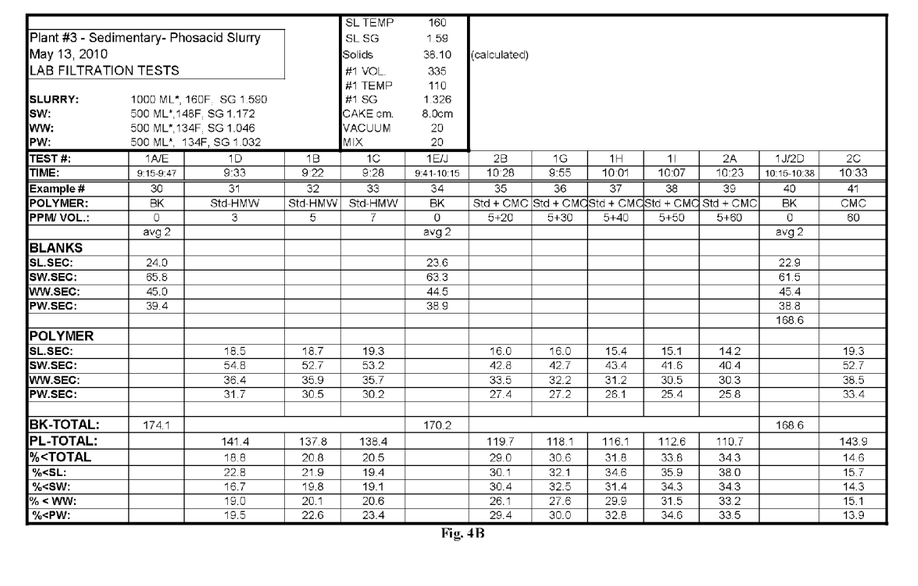
FIG. 4B is a table of data supportive of the chart of FIG. 4A.

FIG. 4A (with supporting data at FIG. 4B) is a chart which shows an example of the synergistic effect of a dual system with CMC polymer for improved filtration on a sedimentary slurry source. The maximum total improvement (or average of all three filtration sections) for standard.-HMW (high molecular weight) polymer is 20.8% improvement in filtration rate over untreated (or Blank) slurry; whereas Dual Standard-HMW+CMC produced 34.3% total improvement in filtration over similar untreated slurry. As a ratio, the Dual gives 1.6 times more improvement than standard-HMW.

It should be understood that the preceding is merely a detailed description of one or more embodiments or examples of this invention. The preceding description, therefore, is not meant to limit the scope of the invention. Rather, the scope of the invention is to be determined only by the appended claims and their equivalents.

What is claimed is:

1. A method for increasing phosphoric acid production obtained from a phosphoric acid slurry derived from igneous rock, the method comprising:
   injecting a CMC polymer solution into a 25-45% phosphoric acid slurry derived from igneous rock, the CMC polymer usage being 5-40 ppm,
   wherein the CMC polymer is carboxymethylcellulose comprising a polymerized cellulose ether,
   wherein the production rate of phosphoric acid derived from the slurry is increased.

2. The method according to claim 1, wherein said CMC polymer at 99.5% dry basis active is a food grade polymer filtration aid.

3. The method according to claim 1, wherein said CMC polymer is an anionic polyelectrolyte with a low polymer molecular weight of 600,000-900,000.

4. The method according to claim 1, wherein said CMC polymer at 60-99.4% dry basis active is a technical grade polymer.

5. The method according to claim 1, wherein the CMC polymer improves filtration rate performance over standard 10-20 million high molecular weight PAM polymers.

6. A method for increasing phosphoric acid production obtained from a phosphoric acid slurry derived from sedimentary rock, the method comprising:
   injecting a standard high molecular weight polymer (A) and a CMC polymer (B) into a 25-45% phosphoric acid slurry derived from sedimentary rock,
   wherein the CMC polymer is carboxymethylcellulose comprising a polymerized cellulose ether,
   wherein the production rate of phosphoric acid derived from the slurry is increased.

* * * * *